United States Patent
Yu et al.

(10) Patent No.: US 12,137,474 B2
(45) Date of Patent: Nov. 5, 2024

(54) METHOD, APPARATUS, COMPUTER PROGRAM PRODUCT AND COMPUTER PROGRAM FOR INTERFERENCE REDUCTION

(71) Applicant: Nokia Technologies Oy, Espoo (FI)

(72) Inventors: Ling Yu, Kauniainen (FI); Vinh Van Phan, Oulu (FI); Zexian Li, Espoo (FI); Karol Schober, Helsinki (FI); Antti Piipponen, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 348 days.

(21) Appl. No.: 17/609,720

(22) PCT Filed: Jun. 14, 2019

(86) PCT No.: PCT/EP2019/065707
§ 371 (c)(1),
(2) Date: Nov. 8, 2021

(87) PCT Pub. No.: WO2020/249229
PCT Pub. Date: Dec. 17, 2020

(65) Prior Publication Data
US 2022/0322370 A1    Oct. 6, 2022

(51) Int. Cl.
*H04W 72/54*    (2023.01)
*H04W 72/20*    (2023.01)

(52) U.S. Cl.
CPC ........... *H04W 72/54* (2023.01); *H04W 72/20* (2023.01)

(58) Field of Classification Search
CPC ..... H04W 72/54; H04W 72/20; H04W 72/23; H04W 72/541; H04W 74/0816
See application file for complete search history.

(56) References Cited

U.S. PATENT DOCUMENTS

| | | | |
|---|---|---|---|
| 8,923,862 B2* | 12/2014 | Jang ....................... | H04W 24/10 455/435.2 |
| 2012/0281563 A1* | 11/2012 | Comsa .................. | H04W 24/10 370/252 |

(Continued)

FOREIGN PATENT DOCUMENTS

| EP | 3456083 A1 | 3/2019 |
|---|---|---|
| EP | 3681197 A1 | 7/2020 |
| WO | 2015/019942 A1 | 2/2015 |
| WO | 2017/196249 A1 | 11/2017 |

OTHER PUBLICATIONS

"New SI proposal: Study on flexible and full duplex for NR", 3GPP TSG RAN Meeting #78, RP-172737, Agenda: 9.1.1, LG Electronics, Dec. 18-21, 2017, 5 pages.

(Continued)

*Primary Examiner* — Hardikkumar D Patel
(74) *Attorney, Agent, or Firm* — Robert P. Michal, Esq.; Carter, DeLuca & Farrell LLP

(57) ABSTRACT

An apparatus in a base station and comprising at least one processor and at least one memory including computer code for one or more programs, the at least one memory and the computer code configured, with the at least one processor, to cause the apparatus at least to: cause scheduling information to be transmitted to a plurality of communication devices and control information to be transmitted to at least one communication device of the plurality of communication devices, said control information controlling in the respective communication device at least one of triggering an inter communication device interference reduction mechanism and parameters of the inter communication device interference reduction mechanism.

18 Claims, 9 Drawing Sheets

(56) References Cited

U.S. PATENT DOCUMENTS

| | | |
|---|---|---|
| 2013/0286873 A1 | 10/2013 | Wilkinson et al. |
| 2015/0382375 A1* | 12/2015 | Bhushan ............. H04W 52/243 370/252 |
| 2018/0213547 A1 | 7/2018 | Ju et al. |
| 2019/0159253 A1* | 5/2019 | Koorapaty .......... H04W 74/006 |

OTHER PUBLICATIONS

Zhang et al., "Full-Duplex Wireless Communications: Challenges, Solutions and Future Research Directions", Proceedings of the IEEE, vol. 104, No. 7, Jul. 2016, pp. 1369-1409.

"3rd Generation Partnership Project; Technical Specification Group Radio Access Network; NR; Physical layer procedures for control (Release 15)", 3GPP TS 38.213, V15.5.0, Mar. 2019, pp. 1-104.

"3rd Generation Partnership Project; Technical Specification Group Radio Access Network; NR; Radio Resource Control (RRC) protocol specification (Release 15)", 3GPP TS 38.331 V15.5.1, Apr. 2019, pp. 1-491.

"3rd Generation Partnership Project; Technical Specification Group Radio Access Network; NR; Physical layer procedures for data (Release 15)", 3GPP TS 38.214, V15.5.0, Mar. 2019, pp. 1-103.

International Search Report and Written Opinion received for corresponding Patent Cooperation Treaty Application No. PCT/EP2019/065707, dated Feb. 28, 2020, 11 pages.

Office action received for corresponding Indian Patent Application No. 202247001722, dated Apr. 20, 2022, 5 pages.

Office action received for corresponding European Patent Application No. 19731697.9, dated Apr. 16, 2024, 6 pages.

\* cited by examiner

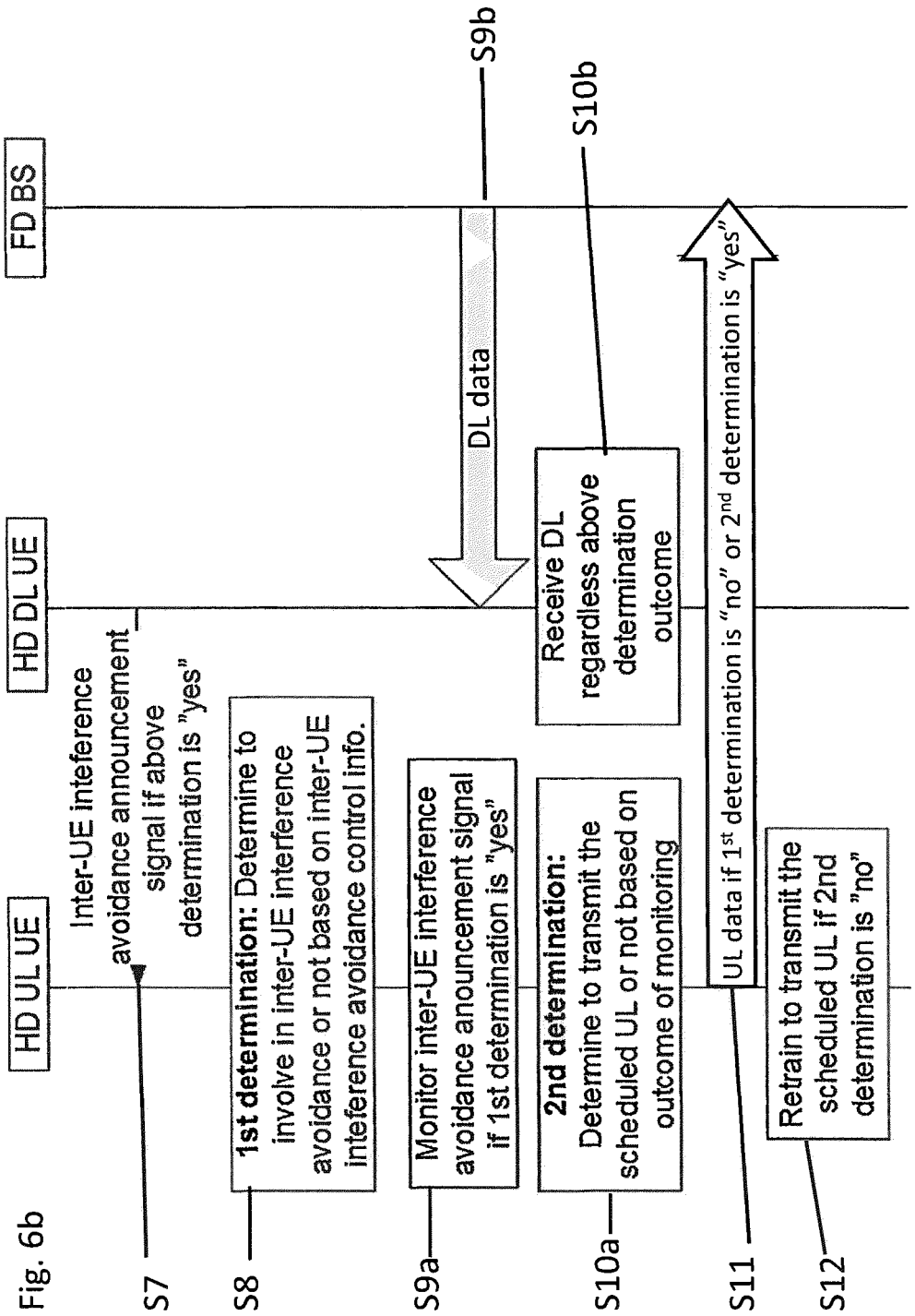

S1 Cause scheduling information to be transmitted to a plurality of communication devices and control information to be transmitted to at least one communication device of the plurality of communication devices

T1 Receive from a base station scheduling information and control information, the control information for controlling at least one of triggering an inter communication device interference reduction mechanism and parameters of the inter communication device interference reduction mechanism.

METHOD, APPARATUS, COMPUTER PROGRAM PRODUCT AND COMPUTER PROGRAM FOR INTERFERENCE REDUCTION

RELATED APPLICATION

This application was originally filed as PCT Application No. PCT/EP2019/065707, filed on 14 Jun. 2019, which is hereby incorporated in its entirety.

FIELD OF THE DISCLOSURE

The present disclosure relates to an apparatus, methods, and computer programs and in particular but not exclusively for apparatus, methods and computer programs to be used in a communications device.

BACKGROUND

A communication system can be seen as a facility that enables communication sessions between two or more entities such as communication devices, base stations/access points and/or other nodes by providing carriers between the various entities involved in the communications path. A communication system can be provided for example by means of a communication network and one or more compatible communications devices.

Access to the communication system may be via an appropriate communications device or terminal. A communications device is provided with an appropriate signal receiving and transmitting apparatus for enabling communications, for example enabling access to a communication network or communications directly with other communications device. The communications device may access a carrier provided by a station or access point, and transmit and/or receive communications on the carrier.

The communication system and associated devices typically operate in accordance with a given standard or specification which sets out what the various entities associated with the system are permitted to do and how that should be achieved.

SUMMARY

According to an aspect, there is provided an apparatus, said apparatus being provided in a base station and comprising at least one processor and at least one memory including computer code for one or more programs, the at least one memory and the computer code configured, with the at least one processor, to cause the apparatus at least to: cause scheduling information to be transmitted to a plurality of communication devices and control information to be transmitted to at least one communication device of the plurality of communication devices, said control information controlling in the respective communication device at least one of triggering an inter communication device interference reduction mechanism and parameters of the inter communication device interference reduction mechanism.

The at least one memory and the computer code may be configured, with the at least one processor, to cause the apparatus to determine that an inter communication device interference reduction mechanism between a plurality of said plurality of communication devices is required.

The control information provided may be is dependent on said determining.

The at least one memory and the computer code may be configured, with the at least one processor, to cause the apparatus to determine that an inter communication device interference reduction mechanism between a plurality of said plurality of communication devices is required is dependent on one or more of: location of one or more of the plurality of communication devices; channel conditions associated with one or more of the plurality of communication devices; quality of service of the data flow associated with one or more of the plurality of communication devices; at least one communication device of the plurality of communication devices is scheduled to transmit at a same time and on a same frequency as at least one other communication device is scheduled to receive; and beam management information.

The scheduling information may comprise a time slot in a given frequency.

At least one communication device of the plurality of communication devices may be scheduled at a same time and on a same frequency as at least one other communication device of the plurality of communication devices.

The same time may be a time slot in a full duplex carrier.

The control information may comprises an indication indicating that an inter communication device interference procedure is to be performed.

The control information indicating that the inter communication device interference reduction mechanism is to be performed may be provided by one or more symbols in the scheduling information overlapping with one or more full-duplex time slots.

The control information may indicate one or more predetermined locations of one or more of said communication devices in which said interference reduction mechanism is to be performed.

The at least one memory and the computer code may be configured, with the at least one processor, to cause the apparatus to select one from one or more predetermined locations as a latest one preceding a scheduled transmission and fulfilling a processing time requirement.

The control information may indicate a flexible symbol preceding a scheduled transmission in which said interference reduction mechanism is to be performed.

The control information may comprise announcement signal information to be used for one of causing the announcement signal to be transmitted and receiving the announcement signal.

The announcement signal information may comprise one or more of: resource information associated with one or more resources on which said announcement signal is to be one of transmitted and received; and power information associated with a power with which said announcement signal is to be transmitted.

The control information may comprise priority information associated with the data of at least one communication device.

The control information may comprise information indicating that suspension of a transmission from at least one communication device is supported.

At least one communication device may be scheduled at a same time and on a same frequency as at least one other communication device.

At least one communication device may be scheduled to transmit at a same time and on a same frequency as at least one other communication device is scheduled to receive.

The same time may be a time slot in a full duplex carrier.

According to another aspect, there is provided an apparatus, said apparatus being provided in a communications device and comprising at least one processor and at least one memory including computer code for one or more programs, the at least one memory and the computer code configured, with the at least one processor, to cause the apparatus at least to: receive from a base station scheduling information and control information, said control information for controlling at least one of triggering an inter communication device interference reduction mechanism and parameters of the inter communication device interference reduction mechanism.

The at least one memory and the computer code may be configured, with the at least one processor, to cause the apparatus to determine, in dependence on said control information, that the communications device is to perform the inter communication device interference reduction mechanism.

The at least one memory and the computer code may be configured, with the at least one processor, to cause the apparatus to, in dependence on the control information, transmit an announcement signal for said the inter communication device interference reduction mechanism.

The at least one memory and the computer code may be configured, with the at least one processor, to cause the apparatus to receive downlink data in dependence on said scheduling information.

The at least one memory and the computer code may be configured, with the at least one processor, to cause the apparatus to, in dependence on the control information, perform detection of an announcement signal transmitted by another communication device.

The at least one memory and the computer code may be configured, with the at least one processor, to cause the apparatus to, in dependence on the control information, perform detection of the announcement signal in dependence on a detection of an energy of said announcement signal.

The at least one memory and the computer code may be configured, with the at least one processor, to cause the apparatus to, determine in dependence on said detection if the communications device is to transmit a scheduled transmission in accordance with the scheduling information.

The at least one memory and the computer code may be configured, with the at least one processor, to cause the apparatus to cause a subset of symbols of a scheduled transmission to be transmitted, said scheduled transmission being in accordance with said scheduling information.

The subset of symbols may be transmitted regardless of whether or not the inter device interference reduction mechanism is performed.

The subset of symbols may not be associated with full duplex operation.

The at least one memory and the computer code may be configured, with the at least one processor, to cause the apparatus to, determine if the communication device is to communicate with the base station in accordance with the scheduling information in dependence on one or more of: a detection of the announcement signal; a priority associated with at least one data flow of the communications device; and a priority associated with at least one data flow of the another communication device.

The control information may comprises an indication indicating that an inter communication device interference procedure is to be performed.

The control information indicating that the inter communication device interference reduction mechanism is to be performed may be provided by one or more symbols in the scheduling information overlapping with one or more full-duplex time slots.

The control information may indicate one or more predetermined locations of one or more of said communication devices in which said interference reduction mechanism is to be performed.

The at least one memory and the computer code may be configured, with the at least one processor, to cause the apparatus to select one from one or more predetermined locations as a latest one preceding a scheduled transmission and fulfilling a processing time requirement.

The control information may indicate a flexible symbol preceding a scheduled transmission in which said interference reduction mechanism is to be performed.

The control information may comprise announcement signal information to be used for one of causing the announcement signal to be transmitted and receiving the announcement signal.

The announcement signal information may comprise one or more of: resource information associated with one or more resources on which said announcement signal is to be one of transmitted and received; and power information associated with a power with which said announcement signal is to be transmitted.

The control information may comprise priority information associated with the data of at least one communication device.

The control information may comprise information indicating that suspension of a transmission from at least one communication device is supported.

At least one communication device may be scheduled at a same time and on a same frequency as at least one other communication device.

At least one communication device may be scheduled to transmit at a same time and on a same frequency as at least one other communication device is scheduled to receive.

The same time may be a time slot in a full duplex carrier.

According to an aspect, there is provided an apparatus, said apparatus being provided in a base station and comprising means for causing scheduling information to be transmitted to a plurality of communication devices and control information to be transmitted to at least one communication device of the plurality of communication devices, said control information controlling in the respective communication device at least one of triggering an inter communication device interference reduction mechanism and parameters of the inter communication device interference reduction mechanism.

The means may be for causing the apparatus to determine that an inter communication device interference reduction mechanism between a plurality of said plurality of communication devices is required.

The control information provided may be is dependent on said determining.

The means may be for determining that an inter communication device interference reduction mechanism between a plurality of said plurality of communication devices is required is dependent on one or more of: location of one or more of the plurality of communication devices; channel conditions associated with one or more of the plurality of communication devices; quality of service of the data flow associated with one or more of the plurality of communication devices; at least one communication device of the plurality of communication devices is scheduled to transmit at a same time and on a same frequency as at least one other communication device is scheduled to receive; and beam management information.

The scheduling information may comprise a time slot in a given frequency.

At least one communication device of the plurality of communication devices may be scheduled at a same time and on a same frequency as at least one other communication device of the plurality of communication devices.

The same time may be a time slot in a full duplex carrier.

The control information may comprises an indication indicating that an inter communication device interference procedure is to be performed.

The control information indicating that the inter communication device interference reduction mechanism is to be performed may be provided by one or more symbols in the scheduling information overlapping with one or more full-duplex time slots.

The control information may indicate one or more predetermined locations of one or more of said communication devices in which said interference reduction mechanism is to be performed.

The means may be for selecting one from one or more predetermined locations as a latest one preceding a scheduled transmission and fulfilling a processing time requirement.

The control information may indicate a flexible symbol preceding a scheduled transmission in which said interference reduction mechanism is to be performed.

The control information may comprise announcement signal information to be used for one of causing the announcement signal to be transmitted and receiving the announcement signal.

The announcement signal information may comprise one or more of: resource information associated with one or more resources on which said announcement signal is to be one of transmitted and received; and power information associated with a power with which said announcement signal is to be transmitted.

The control information may comprise priority information associated with the data of at least one communication device.

The control information may comprise information indicating that suspension of a transmission from at least one communication device is supported.

At least one communication device may be scheduled at a same time and on a same frequency as at least one other communication device.

At least one communication device may be scheduled to transmit at a same time and on a same frequency as at least one other communication device is scheduled to receive.

The same time may be a time slot in a full duplex carrier.

According to another aspect, there is provided an apparatus, said apparatus being provided in a communications device and comprising means for: receiving from a base station scheduling information and control information, said control information for controlling at least one of triggering an inter communication device interference reduction mechanism and parameters of the inter communication device interference reduction mechanism.

The means may be for determining, in dependence on said control information, that the communications device is to perform the inter communication device interference reduction mechanism.

The means may be for, in dependence on the control information, causing transmitting of an announcement signal for said the inter communication device interference reduction mechanism.

The means may be for receiving downlink data in dependence on said scheduling information.

The means may be for, in dependence on the control information, performing detection of an announcement signal transmitted by another communication device.

The means may be for, in dependence on the control information, performing detection of the announcement signal in dependence on a detection of an energy of said announcement signal.

The means may be for, determining in dependence on said detection if the communications device is to transmit a scheduled transmission in accordance with the scheduling information.

The means may be for causing a subset of symbols of a scheduled transmission to be transmitted, said scheduled transmission being in accordance with said scheduling information.

The subset of symbols may be transmitted regardless of whether or not the inter device interference reduction mechanism is performed.

The subset of symbols may not be associated with full duplex operation.

The means may be for determining if the communication device is to communicate with the base station in accordance with the scheduling information in dependence on one or more of: a detection of the announcement signal; a priority associated with at least one data flow of the communications device; and a priority associated with at least one data flow of the another communication device.

The control information may comprises an indication indicating that an inter communication device interference procedure is to be performed.

The control information indicating that the inter communication device interference reduction mechanism is to be performed may be provided by one or more symbols in the scheduling information overlapping with one or more full-duplex time slots.

The control information may indicate one or more predetermined locations of one or more of said communication devices in which said interference reduction mechanism is to be performed.

The means may be for selecting one from one or more predetermined locations as a latest one preceding a scheduled transmission and fulfilling a processing time requirement.

The control information may indicate a flexible symbol preceding a scheduled transmission in which said interference reduction mechanism is to be performed.

The control information may comprise announcement signal information to be used for one of causing the announcement signal to be transmitted and receiving the announcement signal.

The announcement signal information may comprise one or more of: resource information associated with one or more resources on which said announcement signal is to be one of transmitted and received; and power information associated with a power with which said announcement signal is to be transmitted.

The control information may comprise priority information associated with the data of at least one communication device.

The control information may comprise information indicating that suspension of a transmission from at least one communication device is supported.

At least one communication device may be scheduled at a same time and on a same frequency as at least one other communication device.

At least one communication device may be scheduled to transmit at a same time and on a same frequency as at least one other communication device is scheduled to receive.

The same time may be a time slot in a full duplex carrier.

According to an aspect, there is provided an method performed by an apparatus in a base station, said method comprising: causing scheduling information to be transmitted to a plurality of communication devices and control information to be transmitted to at least one communication device of the plurality of communication devices, said control information controlling in the respective communication device at least one of triggering an inter communication device interference reduction mechanism and parameters of the inter communication device interference reduction mechanism.

The method may comprise determining that an inter communication device interference reduction mechanism between a plurality of said plurality of communication devices is required.

The control information provided may be is dependent on said determining.

The method may comprise determining that an inter communication device interference reduction mechanism between a plurality of said plurality of communication devices is required is dependent on one or more of: location of one or more of the plurality of communication devices; channel conditions associated with one or more of the plurality of communication devices; quality of service of the data flow associated with one or more of the plurality of communication devices; at least one communication device of the plurality of communication devices is scheduled to transmit at a same time and on a same frequency as at least one other communication device is scheduled to receive; and beam management information.

The scheduling information may comprise a time slot in a given frequency.

At least one communication device of the plurality of communication devices may be scheduled at a same time and on a same frequency as at least one other communication device of the plurality of communication devices.

The same time may be a time slot in a full duplex carrier.

The control information may comprises an indication indicating that an inter communication device interference procedure is to be performed.

The control information indicating that the inter communication device interference reduction mechanism is to be performed may be provided by one or more symbols in the scheduling information overlapping with one or more full-duplex time slots.

The control information may indicate one or more predetermined locations of one or more of said communication devices in which said interference reduction mechanism is to be performed.

The method may comprise selecting one from one or more predetermined locations as a latest one preceding a scheduled transmission and fulfilling a processing time requirement.

The control information may indicate a flexible symbol preceding a scheduled transmission in which said interference reduction mechanism is to be performed.

The control information may comprise announcement signal information to be used for one of causing the announcement signal to be transmitted and receiving the announcement signal.

The announcement signal information may comprise one or more of: resource information associated with one or more resources on which said announcement signal is to be one of transmitted and received; and power information associated with a power with which said announcement signal is to be transmitted.

The control information may comprise priority information associated with the data of at least one communication device.

The control information may comprise information indicating that suspension of a transmission from at least one communication device is supported.

At least one communication device may be scheduled at a same time and on a same frequency as at least one other communication device.

At least one communication device may be scheduled to transmit at a same time and on a same frequency as at least one other communication device is scheduled to receive.

The same time may be a time slot in a full duplex carrier.

According to another aspect, there is provided a method performed in a communication device, said method comprising: receiving from a base station scheduling information and control information, said control information for controlling at least one of triggering an inter communication device interference reduction mechanism and parameters of the inter communication device interference reduction mechanism.

The method may comprise determining, in dependence on said control information, that the communications device is to perform the inter communication device interference reduction mechanism.

The method may comprise, in dependence on the control information, causing transmitting of an announcement signal for said the inter communication device interference reduction mechanism.

The method may comprise receiving downlink data in dependence on said scheduling information.

The method may comprise, in dependence on the control information, performing detection of an announcement signal transmitted by another communication device.

The method may comprise, in dependence on the control information, performing detection of the announcement signal in dependence on a detection of an energy of said announcement signal.

The method may comprise, determining in dependence on said detection if the communications device is to transmit a scheduled transmission in accordance with the scheduling information.

The method may comprise causing a subset of symbols of a scheduled transmission to be transmitted, said scheduled transmission being in accordance with said scheduling information.

The subset of symbols may be transmitted regardless of whether or not the inter device interference reduction mechanism is performed.

The subset of symbols may not be associated with full duplex operation.

The method may comprise determining if the communication device is to communicate with the base station in accordance with the scheduling information in dependence on one or more of: a detection of the announcement signal; a priority associated with at least one data flow of the communications device; and a priority associated with at least one data flow of the another communication device.

The control information may comprises an indication indicating that an inter communication device interference procedure is to be performed.

The control information indicating that the inter communication device interference reduction mechanism is to be performed may be provided by one or more symbols in the scheduling information overlapping with one or more full-duplex time slots.

The control information may indicate one or more predetermined locations of one or more of said communication devices in which said interference reduction mechanism is to be performed.

The method may comprise selecting one from one or more predetermined locations as a latest one preceding a scheduled transmission and fulfilling a processing time requirement.

The control information may indicate a flexible symbol preceding a scheduled transmission in which said interference reduction mechanism is to be performed.

The control information may comprise announcement signal information to be used for one of causing the announcement signal to be transmitted and receiving the announcement signal.

The announcement signal information may comprise one or more of: resource information associated with one or more resources on which said announcement signal is to be one of transmitted and received; and power information associated with a power with which said announcement signal is to be transmitted.

The control information may comprise priority information associated with the data of at least one communication device.

The control information may comprise information indicating that suspension of a transmission from at least one communication device is supported.

At least one communication device may be scheduled at a same time and on a same frequency as at least one other communication device.

At least one communication device may be scheduled to transmit at a same time and on a same frequency as at least one other communication device is scheduled to receive.

The same time may be a time slot in a full duplex carrier.

According to another aspect there is provided an apparatus, said apparatus being provided in a base station and comprising circuitry configured to: cause scheduling information to be transmitted to a plurality of communication devices and control information to be transmitted to at least one communication device of the plurality of communication devices, said control information controlling in the respective communication device at least one of triggering an inter communication device interference reduction mechanism and parameters of the inter communication device interference reduction mechanism.

The circuitry may be configured to cause the apparatus to determine that an inter communication device interference reduction mechanism between a plurality of said plurality of communication devices is required.

The control information provided may be is dependent on said determining.

The circuitry may be configured to determine that an inter communication device interference reduction mechanism between a plurality of said plurality of communication devices is required is dependent on one or more of: location of one or more of the plurality of communication devices; channel conditions associated with one or more of the plurality of communication devices; quality of service of the data flow associated with one or more of the plurality of communication devices; at least one communication device of the plurality of communication devices is scheduled to transmit at a same time and on a same frequency as at least one other communication device is scheduled to receive; and beam management information.

The scheduling information may comprise a time slot in a given frequency.

At least one communication device of the plurality of communication devices may be scheduled at a same time and on a same frequency as at least one other communication device of the plurality of communication devices.

The same time may be a time slot in a full duplex carrier.

The control information may comprises an indication indicating that an inter communication device interference procedure is to be performed.

The control information indicating that the inter communication device interference reduction mechanism is to be performed may be provided by one or more symbols in the scheduling information overlapping with one or more full-duplex time slots.

The control information may indicate one or more predetermined locations of one or more of said communication devices in which said interference reduction mechanism is to be performed.

The circuitry may be configured to select one from one or more predetermined locations as a latest one preceding a scheduled transmission and fulfilling a processing time requirement.

The control information may indicate a flexible symbol preceding a scheduled transmission in which said interference reduction mechanism is to be performed.

The control information may comprise announcement signal information to be used for one of causing the announcement signal to be transmitted and receiving the announcement signal.

The announcement signal information may comprise one or more of: resource information associated with one or more resources on which said announcement signal is to be one of transmitted and received; and power information associated with a power with which said announcement signal is to be transmitted.

The control information may comprise priority information associated with the data of at least one communication device.

The control information may comprise information indicating that suspension of a transmission from at least one communication device is supported.

At least one communication device may be scheduled at a same time and on a same frequency as at least one other communication device.

At least one communication device may be scheduled to transmit at a same time and on a same frequency as at least one other communication device is scheduled to receive.

The same time may be a time slot in a full duplex carrier.

According to another aspect, there is provided an apparatus, said apparatus being provided in a communications device and comprising circuitry configured to: receive from a base station scheduling information and control information, said control information for controlling at least one of triggering an inter communication device interference reduction mechanism and parameters of the inter communication device interference reduction mechanism.

The circuitry may be configured to determine, in dependence on said control information, that the communications device is to perform the inter communication device interference reduction mechanism.

The circuitry may be configured to, in dependence on the control information, cause transmitting of an announcement signal for said the inter communication device interference reduction mechanism.

The circuitry may be configured to receive downlink data in dependence on said scheduling information.

The circuitry may be configured to, in dependence on the control information, perform detection of an announcement signal transmitted by another communication device.

The circuitry may be configured to, in dependence on the control information, perform detection of the announcement signal in dependence on a detection of an energy of said announcement signal.

The circuitry may be configured to, determine in dependence on said detection if the communications device is to transmit a scheduled transmission in accordance with the scheduling information.

The circuitry may be configured to cause a subset of symbols of a scheduled transmission to be transmitted, said scheduled transmission being in accordance with said scheduling information.

The subset of symbols may be transmitted regardless of whether or not the inter device interference reduction mechanism is performed.

The subset of symbols may not be associated with full duplex operation.

The circuitry may be configured to determine if the communication device is to communicate with the base station in accordance with the scheduling information in dependence on one or more of: a detection of the announcement signal; a priority associated with at least one data flow of the communications device; and a priority associated with at least one data flow of the another communication device.

The control information may comprises an indication indicating that an inter communication device interference procedure is to be performed.

The control information indicating that the inter communication device interference reduction mechanism is to be performed may be provided by one or more symbols in the scheduling information overlapping with one or more full-duplex time slots.

The control information may indicate one or more predetermined locations of one or more of said communication devices in which said interference reduction mechanism is to be performed.

The circuitry may be configured to select one from one or more predetermined locations as a latest one preceding a scheduled transmission and fulfilling a processing time requirement.

The control information may indicate a flexible symbol preceding a scheduled transmission in which said interference reduction mechanism is to be performed.

The control information may comprise announcement signal information to be used for one of causing the announcement signal to be transmitted and receiving the announcement signal.

The announcement signal information may comprise one or more of: resource information associated with one or more resources on which said announcement signal is to be one of transmitted and received; and power information associated with a power with which said announcement signal is to be transmitted.

The control information may comprise priority information associated with the data of at least one communication device.

The control information may comprise information indicating that suspension of a transmission from at least one communication device is supported.

At least one communication device may be scheduled at a same time and on a same frequency as at least one other communication device.

At least one communication device may be scheduled to transmit at a same time and on a same frequency as at least one other communication device is scheduled to receive.

The same time may be a time slot in a full duplex carrier.

According to an aspect there is provided a computer program comprising computer executable code which when run on at least one processor is configured to cause any of the previously described methods to be performed.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

BRIEF DESCRIPTION OF THE FIGURES

Embodiments will now be described, by way of example only, with reference to the accompanying Figures in which:

FIGS. 6*a* and 6*b* show an example signal flow with a full duplex base station, a half-duplex transmitting communications and a half duplex receiving communications device;

FIG. 8 shows a method of some embodiments performed in a base station; and

FIG. 9 shows a method of some embodiments performed in a communications device.

DETAILED DESCRIPTION OF THE FIGURES

In the following certain embodiments are explained with reference to communications devices capable of communication via a wireless cellular system and communication systems serving such communications devices. Before explaining in detail the exemplifying embodiments, certain general principles of a wireless communication system, access systems thereof, and communications devices are briefly explained with reference to FIGS. 1 and 2 to assist in understanding the technology underlying the described examples.

Figure 1:
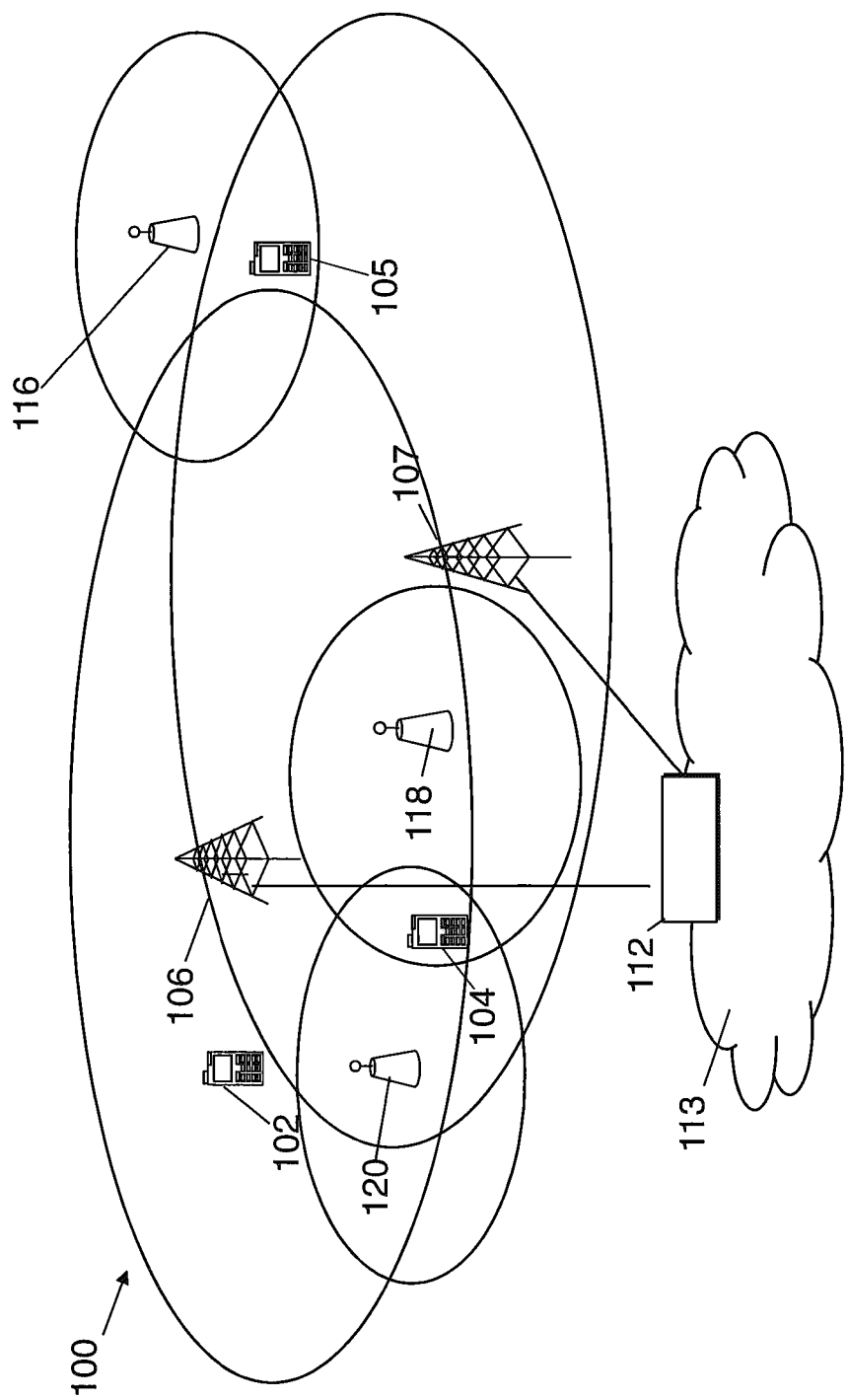
FIG. 1 shows a schematic representation of a communication system.

Reference is made to FIG. 1 which shows an example system 100 in which some embodiments may be provided. The system may be a wireless communications system. In a wireless communication system 100, such as that shown in FIG. 1, communication devices or user equipment (communication device) 102, 104, and 105 are provided. Some examples of communications devices are discussed below and as used in this document the term communication device is intended to cover any one or more of those devices and/or any other suitable device.

The communication devices may be provided wireless access via at least one base station (or similar wireless transmitting and/or receiving node or point).

In FIG. 1, there are base stations BS 106 and 107 which serve relatively large cells.

Smaller cell base stations 116, 118 and 120 may also be provided. The smaller base stations 116, 118 and 120 may be pico or femto level base stations or the like. In some embodiments, the smaller base stations may not be provided.

One or more of the base stations may communicate with a network 113 via one or more network functions 112. One or more of the base stations may communicate with the network via one or more other base stations. For example one or more smaller base stations may communicate with a network via one or more of the large base stations.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). One 3GPP based development is often referred to as the long term evolution (LTE) of the Universal Mobile Telecommunications System (UMTS) radio-access technology. Some developments of LTE are referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs). Another example of a suitable communications system is the 5G or New Radio (NR) concept. Base stations of NR systems may be known as next generation Node Bs (gNBs). The base station may be an ng-eNB. Other examples of radio access system comprise those provided by base stations of systems that are based on technologies such as wireless local area network (WLAN) and/or WiMAX (Worldwide Interoperability for Microwave Access). It should be appreciated that embodiments may be provided in the context of any of these standards, developments of any of these standards or any other suitable standard.

A base station can provide coverage for an entire cell or similar radio service area. Some examples of access points or base stations have been mentioned and as used in this document the term base station is intended to cover any one or more of those devices and/or any other suitable device.

Figure 2:
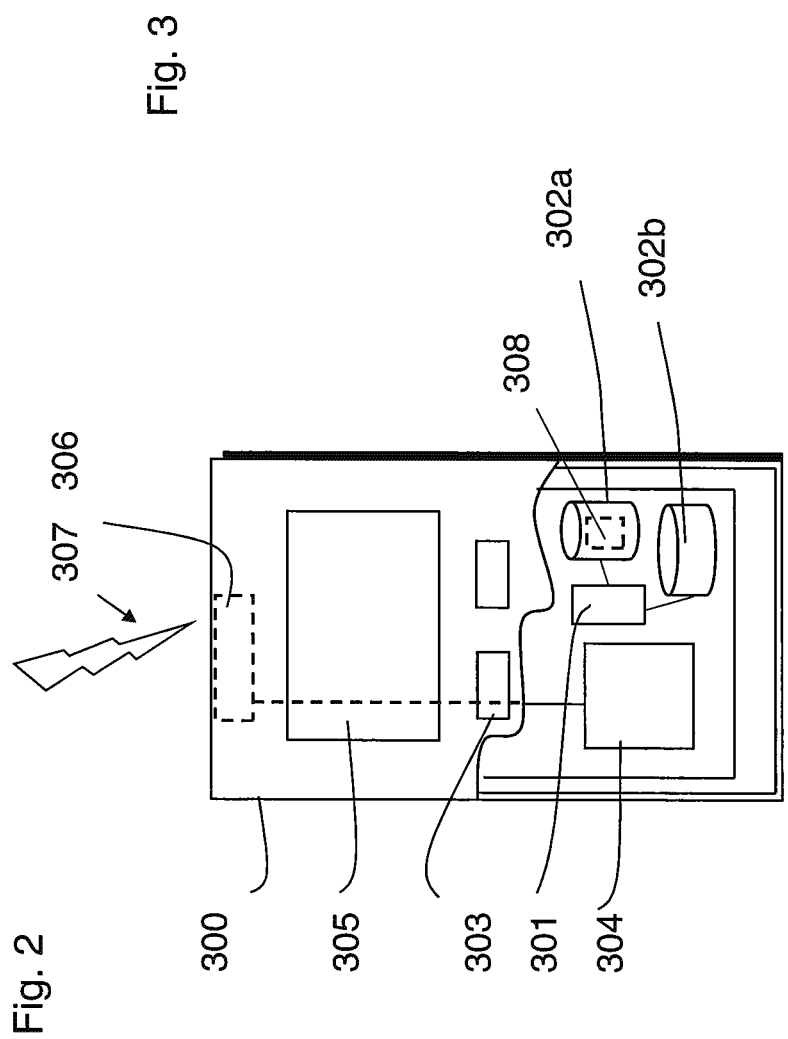
FIG. 2 shows a schematic representation of a communications device.

FIG. 2 illustrates an example of a communications device 300, such as the wireless communications device 102, 104 or 105 shown in FIG. 1. Such communication devices are sometimes referred to as user equipment UE. The wireless communications device 300 may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, machine-type communications (MTC) devices, IoT type communications devices or any combinations of these or the like. The communications device may be incorporated within another device.

The device 300 may receive signals over an air or radio interface 307 via appropriate apparatus for receiving and may transmit signals via appropriate apparatus for transmitting radio signals. In FIG. 2, transceiver apparatus is designated schematically by block 306. The transceiver apparatus 306 may be provided for example by means of a radio part and associated antenna arrangement. The antenna arrangement may be arranged internally or externally to the mobile device. In some embodiments, a plurality of transceivers may be provided by the transceiver apparatus.

The wireless communications device 300 may be provided with at least one processor 301 and at least one memory. The at least one memory may comprise at least one ROM 302a and/or at least one RAM 302b and/or any other suitable memory.

The communications device may comprise other possible components 303 for use in software and hardware aided execution of tasks it is designed to perform, including control of access to and communications with access systems and other communications devices. The at least one processor 301 is coupled to the at least one memory. The at least one processor 301 may be configured to execute an appropriate software code 308 to implement one or more of the following aspects. The software code 308 may be stored in the at least one memory, for example in the at least one ROM 302b.

The processor, storage and other relevant control apparatus can be provided on an appropriate circuit board and/or in chipsets. This feature is denoted by reference 304.

The device may optionally have a user interface such as key pad 305, touch sensitive screen or pad, combinations thereof or the like.

Optionally one or more of a display, a speaker and a microphone may be provided depending on the type of the device.

Figure 3:
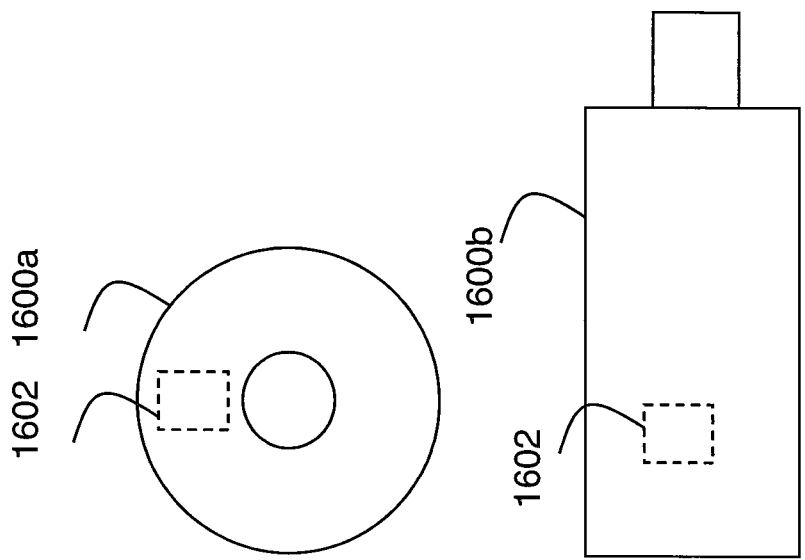
FIG. 3 shows a schematic representation of non-volatile memory media.

FIG. 3 shows a schematic representation of non-volatile memory media 1600a (e.g. computer disc (CD) or digital versatile disc (DVD)) and 1600b (e.g. universal serial bus (USB) memory stick) storing instructions and/or parameters 1602 which when executed by a processor allow the processor to perform one or more of the steps of any of the methods of any of the embodiments.

Figure 4:
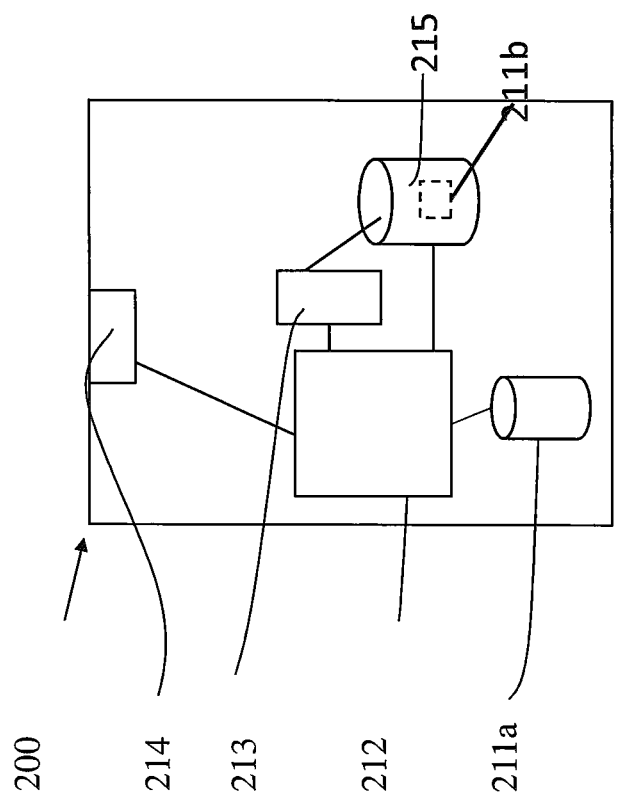
FIG. 4 shows an apparatus provided in a base station.

An example apparatus 200 is shown in FIG. 4. The apparatus shown in FIG. 4 may be provided in a base station. The apparatus comprises at least one memory. The at least one memory may be at least one random access memory (RAM) 211a and/or at least one read only memory (ROM) 211b and/or any other suitable memory. The apparatus may comprise at least one processor 212, 213. The apparatus may comprise an input/output interface 214. The at least one processor 212, 213 is coupled to the RAM 211a and the ROM 211b. The at least one processor 212, 213 may be configured to execute an appropriate software code 215 to implement one or more of the following aspects. The software code 215 may be stored in the ROM 211b.

Some embodiments may employ some existing downlink control information (DCI). By way of example only, some embodiments may employ DCI format 2_0 such as described in Rel-15 NR (licensed band operation).

The DCI format may indicate one or more SFI (slot format information) for one or more serving cells. Each SFI index may indicate a high-layer preconfigured combination of single-slot formats. Each slot format indicating direction of symbols with the slot.

The base station may configure per cell up to for example 512 (9 bits) format combinations One combination can indicate a slot format for example for up to 256 slots.

The slot format of a single slot may be configured as an 8-bit entry where D is a downlink symbol, U is an uplink symbol and F is a flexible symbol. A flexible symbol denotes "no transmit, no receive" and may be used for example to provide an UL/DL switching gap, to denote the symbol to be 'reserved' or to facilitate dynamic traffic adaptation between the downlink and uplink. The traffic adaption may be based on the decision by the base station scheduler.

Some embodiments may depend on flexible scheduling times for PDSCH and PUSCH which may be denoted as K0 and K2, respectively. A base station may configure multiple entries of K0 and K2 using one or more suitable information elements IE.

The scheduling DCI may indicate one of the K0 or K2 preconfigured values dynamically.

The values of K0 and K2 may indicate the slot where the PDSCH and PUSCH are scheduled, relative to slot where the corresponding UL grant or DL assignment has been received. The value of K0 may be 0 (except for the case of cross-carrier scheduling with mixed numerologies). In some embodiments, but K2 may have to fulfil a defined processing timeline. This may be defined as N2 in 5G/NR in TS38.214.

Some devices discussed above may be capable of full duplex (FD) communication. It has been proposed to provide support for such devices in NR or 5G system.

FD may reduce e.g. latency in TDD (time division duplex) or provide larger data rates by transmitting and receiving at the same time. However, it should be appreciated that FD may be used in any other suitable system.

In some embodiments, FD may be supported at the network side. For example, the base station BS may support FD.

In some embodiments, the UE may support half-duplex (HD). The UE may not support FD. In other embodiments, the UE may support FD but may operate in a HD mode when required, defined or configured.

In some embodiments, the BS may support FD at the network side and one or more of the UEs may be half-duplex (HD). The UEs may be backward compatible UEs. In some embodiments, where the UE only supports HD, this may mean that no extra complexity on UE implementation is required.

In some embodiments, a serving BS is FD capable on at least a given carrier and uses the given carrier to serve a plurality of HD-only capable UEs and/or UEs operating in an HD mode.

In some embodiments, the FD BS has a capability to reduce or cancel self-interference on the DL transmission and UL reception to/from a plurality of UEs. In some embodiments, the UE during HD operation will not have self-interference between its UL transmission and its own DL reception since DL/UL will occupy different resources. However, there may be inter-UE interference due to the FD BS.

Figure 5:
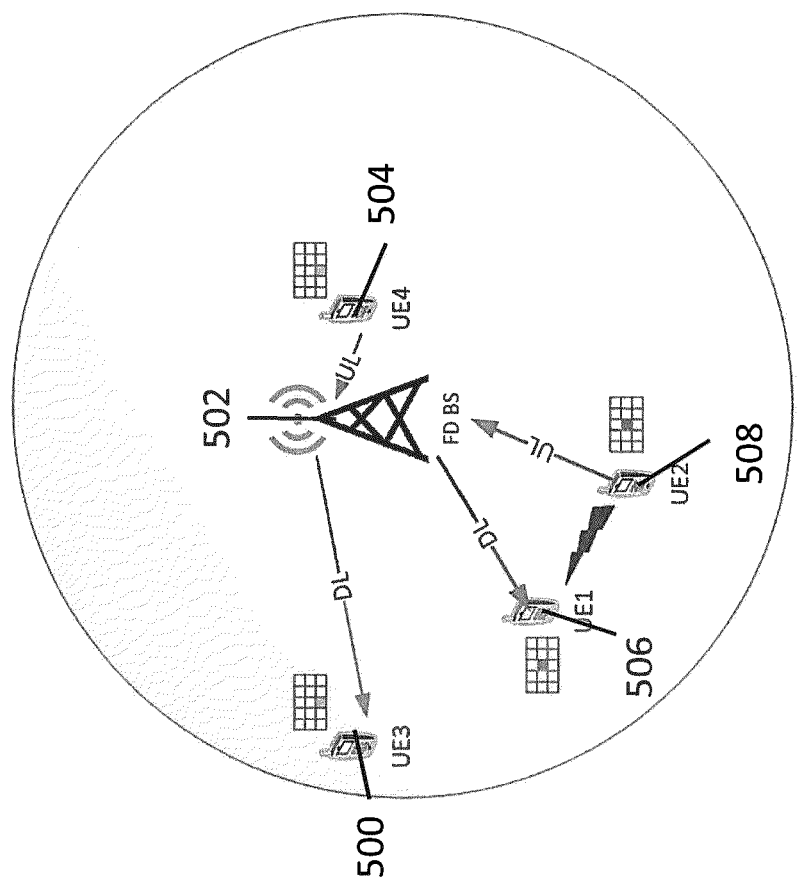
FIG. 5 shows a situation where inter-UE interference arises.

Reference is made to FIG. 5 which illustrates a scenario where inter-UE interference arises. For example a FD BS 502 schedules overlapping DL resources for UE1 506 and UL resources for UE2 508. The UL transmission of UE2 508 may interfere with the DL reception of UE1 506, for example if UE1 506 and UE2 508 are in proximity. This may potentially cause DL reception failure for the UE1.

It may be desirable to reduce or avoid such inter-UE interference.

In case of UE3 500 and UE4 504, the FD BS 502 schedules overlapping DL resources for UE3 500 and UL resources for UE4 504. The UL transmission of UE4 504 may not interfere or the interference may be negligible with the DL reception of UE3 500. This may be due to the relatively large distance between UE3 500 and UE4 504 and/or the relatively low UL transmission power of UE4 504 due to the relatively close proximity of the UE4 504 to BS 502.

Some embodiments may address the issue of detection and/or avoidance (or at least reduction) of potential inter-UE interference. Some embodiments may be used in FD systems where the avoidance or reduction of inter-UE interference is desirable.

Some embodiments may facilitate a FD carrier with detection and/or avoidance (or a reduction) of inter-UE interference. The detection may be relatively fast.

In some embodiments, even with FD carrier, there may be resources intended for half duplex operation, for example broadcast SIB messages.

Some embodiments may address the issue of inter-UE interference in an FD system.

In some embodiments, an apparatus of the base station may schedule a number of UEs to transmit in UL. These UEs are referred to as UL UEs. The UL UEs may be scheduled in one or more of upcoming time slots or transmission time interval (TTI) of a FD carrier to transmit to the base station.

The apparatus of the base station may schedule a number of UEs to receive in DL. These UEs are referred to as DL UEs. The DL UEs may be scheduled in one or more of upcoming time slots or transmission time interval (TTI) of a FD carrier to receive from the base station.

The DL UEs may be different to the UL UEs.

The apparatus in the base station may determine whether there is a need to initiate an inter-UE interference avoidance or reduction procedure or not. The inter-UE interference may be between at least one of the DL UEs and at least one the UL UEs operated by the base station.

In some embodiments, the determining may be simply based on the overlapping resources scheduled to DL and UL UEs for receiving from and transmission to the base station respectively.

In some embodiments, the determining may alternatively or additionally be based on one more parameters or conditions. By way of example only, the one or more parameters or conditions may comprise one or more of the following: location of one or more UL UEs; location of one or more DL UEs; one or more channel conditions of one or more UL UEs; one or more channel conditions of one or more DL UEs; beam management information of one or more UL UEs; beam management information of one or more DL UEs; QoS (quality of service) of data of one or more UL UEs; and QoS of data of one or more DL UEs.

If the apparatus in the base station determines that there is a need to initiate an inter-UE interference avoidance or reduction procedure, the apparatus may determine one or more of resources and instructions for one or more UEs to perform an inter-UE interference detection and/or avoidance procedure.

In some embodiments, the apparatus of the BS may be configured to cause the BS to signal a scheduling assignment/grant to the scheduled UEs. The scheduling assignment/grant may comprise timing information for the UL UEs to transmit and the DL UEs to receive. The timing information may indicate a TTI of the FD carrier. The TTI may be an upcoming TTI of the FD carrier.

The scheduling assignment may alternatively or additionally comprise control information for the inter-UE interference avoidance or reduction.

Alternatively the control information for the inter-UE interference avoidance or reduction may be provided separately to the scheduling assignment.

The control information for the inter-UE interference avoidance or reduction may comprise one or more of:
an indication whether inter-UE interference avoidance or reduction is needed or not;
an indication of a type of the symbol; and
inter-UE interference avoidance or reduction assistance information.

The inter-UE interference avoidance or reduction assistance information may comprise one or more of:
spatial resource information of an inter-UE interference announcement signal;
one or more of time, frequency, code, or beam domain resource information of an inter-UE interference announcement signal;
TX (transmit) power of an inter-UE interference announcement signal from DL UEs to announce at least DL was scheduled and/or the assigned DL resource;
scheduled priority level of at least one of the UL and DL data of the scheduled UEs; and
information indicating if early suspension of the DL transmission is supported or not.

An apparatus of the DL UE may receive a scheduling assignment/grant from a serving BS. The scheduling assignment/grant may be as discussed previously.

In some embodiments the scheduling assignment may provide control information for the DL UE to receive in DL transmission in the upcoming slot of the FD carrier and control information for the inter-UE interference avoidance or reduction.

The apparatus of the DL UE, based on the received control information for the inter-UE interference avoidance or reduction, may determine whether the DL UE needs to be involved in the inter-UE interference avoidance or reduction or not.

In some embodiments, the apparatus of the UE may determine that it needs to perform interference avoidance/reduction if at least one symbol of an assigned PDSCH (physical downlink shared channel) overlaps with symbol of a particular type indicated in the GC-PDCCH (group common physical downlink shared channel). This symbol may indicate a full-duplex type. This may be one of a plurality of different symbol types. Other of the different symbol types may be one or more of: flexible (e.g. can be uplink or downlink), DL and UL.

In some embodiments, the UE determines that the UE needs to perform interference avoidance/reduction only if the DL assignment indicates K0>0.

The apparatus of the DL UE, in case the outcome of the above determining is positive, may cause an inter-UE interference avoidance/reduction announcement signal to be sent according to the received control information for the inter-UE interference avoidance/reduction before receiving DL data according to the received scheduling assignment.

The DL UE, regardless of the outcome of the above determining, may attempt to receive the PDSCH according to the received DL scheduling assignment.

An apparatus of the UL UE apparatus may receive an UL scheduling assignment/grant from a serving BS. This may be as previously described. The scheduling assignment/grant may provide control information for the UL UE to transmit in UL in the upcoming slot of the FD carrier. The scheduling assignment may comprise control information for the inter-UE interference avoidance or reduction.

In case of UL configured grant transmission, the control information for the UL UE may be delivered via a RRC (radio resource control) message and/or via L1 DL control channel. By way of example only, the L1 DL control channel may be a PDCCH (physical downlink control channel).

The apparatus of the UL UE may, based on the received control information for the inter-UE interference avoidance or reduction, determine whether the UL UE needs to be involved in the inter-UE interference avoidance/reduction or not. This may be a first determination.

In some embodiments, an apparatus of a UE may determine that it needs to perform interference avoidance/reduction if at least one symbol of the assigned PDSCH overlaps with a symbol of the particular type (discussed previously) which may be indicated in the GC-PDCCH. This may indicate the full-duplex type.

The apparatus of UL UE may, in case the outcome of the above determining is positive, monitor for the inter-UE interference avoidance/reduction announcement signal(s) from one or more involved DL UEs. This may be in accordance with the received control information for the inter-UE interference avoidance/reduction. This monitoring may be performed before the UL UE transmits with UL resource according to the received scheduling assignment.

Alternatively or additionally, the apparatus of the UE may determine the frequency and/or time domain resource for sensing the announcement signal/energy threshold as the latest predetermined location from a set of predetermined location/symbol(s) that are earlier than the scheduled UL resource for the transmission indicated by the scheduling assignment.

The apparatus of the UL UE may, based on the outcome of the above monitoring, perform a second determining. This may be to whether or not the UL UE is to transmit in the UL according to the received scheduling assignment. For example where the UL UE did not receive any of the announcement signal(s), the UL UE may transmit in accordance with the scheduling assignment. In the case where the UL UE did receive or detect one or more announcement signal, the apparatus of the UE may be configured to cause the UL UE to refrain from the transmitting in UL.

In some embodiments, the apparatus of the UE may drop/puncture only symbols or a subset of symbols of the PUSCH that overlap with the indicated particular type of symbols.

The UL UE, in case the outcome of the first determining is negative or the outcome of the second determining is to transmit, transmits in UL according to the received scheduling assignment.

Figure 6A:
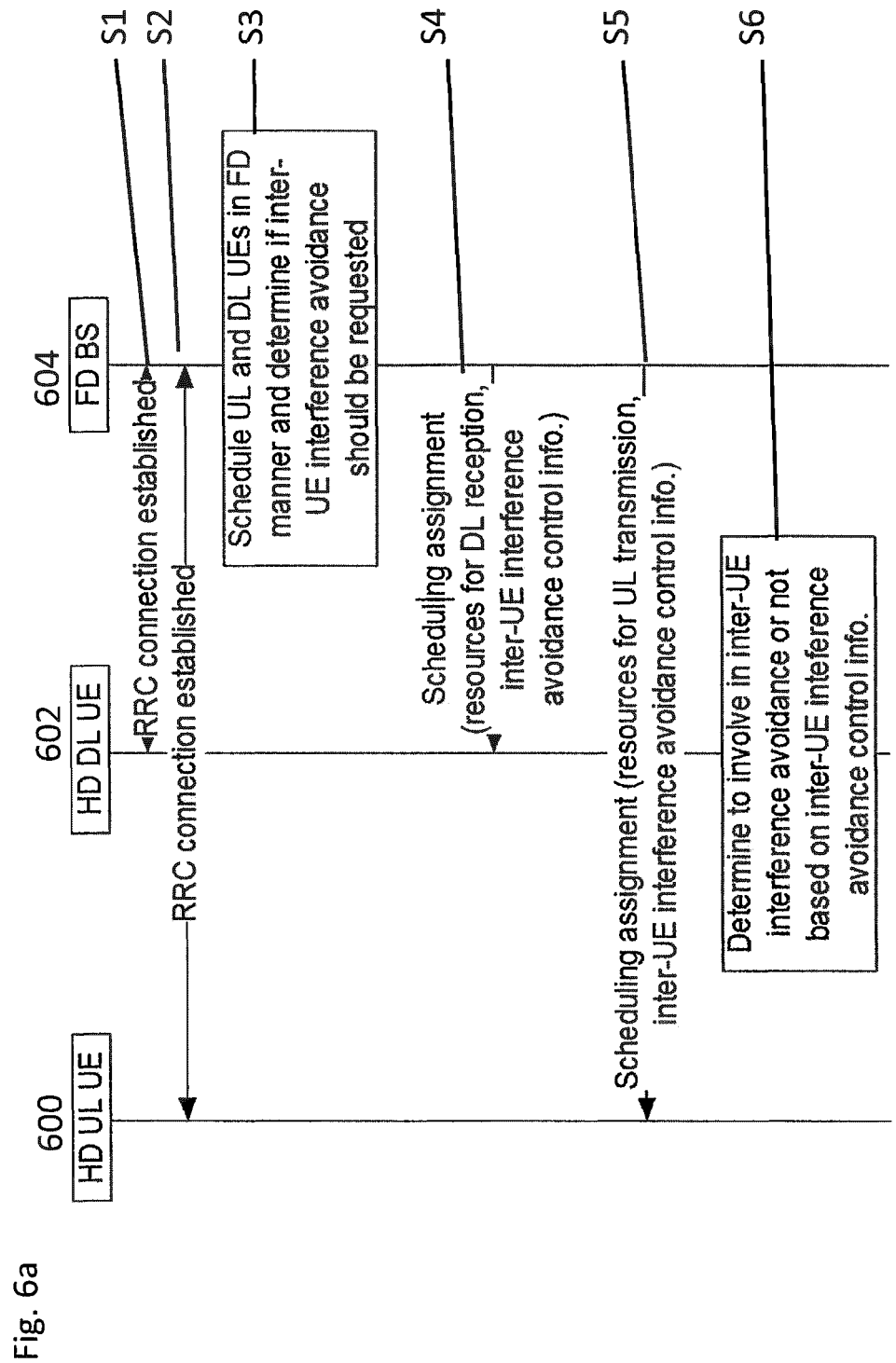

Reference is made to FIGS. 6a and 6b which shows a signal flow between a first HD/FD UE 600 scheduled for uplink transmission (referred to as HD UL UE), a second HD/FD UE 602 scheduled for downlink reception (referred to as HD DL UE) and a FD base station.

Thus in some embodiments, a base station has a FD capability and the scheduled UL and DL UEs support HD only or are operating at least in an HD mode.

The apparatus of the FD BS may schedule the UL and DL UEs in the granularity of TTI such as in cellular systems such as LTE or 5G. It should be appreciated that in other embodiments, a different measure of granularity may be used when scheduling the UL and DL UEs.

In some embodiments each individual UL and DL UE may have flexible TTI with a different interval. In some systems, such as NR/5G, the length (e.g. 0.125 ms, 0.25 ms, 0.5 ms, 1 ms) of a TTI is not fixed. Rather the length of the TTI may be flexibly configured and/or indicated. Each individual UL UE and DL UE may be scheduled with a flexible TTI with different interval length of, for example, between 2-14 symbols. For example the UL may have a TTI of a first length and the DL may have a TTI of a second length. The first length and the second length may be different. By way of example only, a UL UE may be configured and/or indicated to have TTI of 0.25 ms and the DL UE may be configured and/or indicated to have TTI of 1 ms. Interference from the UL UE to the DL UE may happen if the scheduled resources are partially overlapping in both time and frequency domain.

The scheduling assignment may be transmitted in the DL control channel as the DL/UL resource/scheduling grant. The DL control channel may be the PDCCH or any other suitable channel.

With reference to FIG. 6a, in step S1, a connection is established between the FD base station 604 and the HD DL UE 602. This connection may be any suitable connection. By way of example only, the connection may be a radio resource control RRC connection.

In step S2, a connection is established between the FD base station 604 and the HD UL UE 600. This connection may be any suitable connection. By way of example only, the connection may be a radio resource control RRC connection.

It should be noted that step S1 and S2 may take place in any order or even substantially at the same time.

In step S3, an apparatus of the FD BS schedules the HD DL UE 602 and the HD UL UE 600. The apparatus of the FD BS determines if inter UE avoidance/reduction should be requested.

When the apparatus of the FD BS schedules the overlapping UL and DL resources to different UEs and is not sure whether the scheduled UEs will interfere with each other or not, the apparatus of the FD BS may determine whether or not to request that the scheduled UL and DL UEs should be involved in the inter-UE interference avoidance/reduction procedure.

The decision by the apparatus of the FD BS may be based on one or more of:
  awareness of the location of one or more of the UEs;
  channel conditions associated with one or more of the UEs;
  QoS of the data flow of the UL UE;
  QoS of the data flow of the DL UE;
  previously detected collision for the co-scheduled UEs; and
  beam management information.

Beamforming may be used in some standard such as for example NR/5G. The BS may maintain the beam management related information for each UE and may know that the transmission/reception beams for some UEs have the potential to cause the interference with transmission/reception beams for other UEs. In some embodiments, the decision on whether inter-UE interference avoidance/reduction should be requested or not may be based at least partially beam management information The FD BS may not request the scheduled UL and DL UEs to initiate the inter-UE interference avoidance/reduction even though overlapping resources are allocated to those UEs in response to one or more conditions. For example, if a reliability requirement of say the data flow of the DL UE is not high and/or the latency requirement of the data of the DL UE can afford retransmissions and /or a collision between the two UEs has not been detected by the BS, the FD BS may not request the scheduled UL and DL UEs to initiate the inter-UE interference avoidance/reduction even though overlapping resources are allocated to those UEs.

In some embodiments, the decision whether to trigger the inter-UE interference avoidance/reduction procedure may be simply only based on whether overlapping resources are scheduled to DL and UL UEs. In some embodiments, additional information such as described previously may also be taken into account. For example, if the apparatus of the BS knows the location of UE (e.g. based on a location report and/or based on timing advance information and/or the like), the apparatus of the BS may request the UEs to initiate inter-UE interference avoidance/reduction only if the two UEs are within a certain distance or based on the distances between the UEs and the configured transmission power of UL UEs. The configured transmission power may be the result of power control for the UL UE and related to the distance between UL UE and the BS).

In step S4, the apparatus of the FD BS may be configured to cause the scheduling assignment to be transmitted to the HD DL UE. The scheduling assignment may comprise resources for DL reception and inter-UE interference avoidance/reduction control information.

In step S5, the apparatus of the FD BS may be configured to cause the scheduling assignment to be transmitted to the UL DL UE. The scheduling assignment may comprise resources for UL transmission and inter-UE interference avoidance/reduction control information.

Step S4 and S5 may take place in either order or even generally at the same time or even within the same control message.

The control information for the inter-UE interference avoidance/reduction may be signalled to at least one of the DL UEs and/or to at least one of the UL UEs individually and/or commonly, in part or in whole. For example, the time-frequency and/or allocated reference signal and/or transmission power can be signalled to the at least one of the DL UEs individually together with the scheduling control information for receiving in DL and transmitting in UL. The indication of triggering/requesting the inter-UE interference avoidance/reduction and scheduling priority level of at least one of the DL UEs may be signalled commonly to least one of the DL UEs and/or at least one of the UL UEs as the common control signalling.

Though the control information is signalled for facilitating the inter-UE interference avoidance/reduction in the FD carrier, the control information may be transmitted to at least one of the DL and UL UEs in another carrier. This another carrier may be for example an HD carrier. This may provide for more reliable control information delivery.

In step S6, the apparatus of the DL UE is configured to determine whether or not to perform or carry out an inter-UE interference avoidance/reduction procedure or process. This may be in dependence on the control information received from the FD BS.

If it is determined in step S6 by the apparatus of the HD DL UE that an inter-UE interference avoidance/reduction procedure should be carried out, then the apparatus of the HD DL UE is configured in step S7 to cause an inter-UE interference avoidance/reduction announcement signal to be transmitted.

The announcement signal may use the reference signal. In this embodiment, there may be no additional information, only the reference signal sequence. Upon detecting the reference signal, the apparatus of the UL UE will know that there is DL UE in proximity which is scheduled the overlapping resources.

In some embodiments, the UL UE may perform only simple energy detection, because the timing difference between UL and DL UE may not allow for coherent-detection. Energy detection may be performed during a given time-interval of symbol, similarly as in Listen-Before-Talk (LBT) mechanism used in unlicensed spectrum, e.g. LAA LTE.

Alternatively or as an additional option is to transmit a few bits e.g. to indicate the priority of the DL scheduling assignment. Upon receiving this, UL knows there is overlapping resources scheduled to DL UE in proximity and also knows the priority of DL UE. Thus the, UL UE may determine whether to refrain its UL transmission based on its own priority and priority of DL UE.

One option of the time and frequency resources of the inter-UE interference avoidance/reduction announcement signal is to define one or more symbols before the actual data transmission of DL and UL in the frame structure within a slot for the DL UEs to announce the scheduled DL assignment. The one or more symbols can be flexibly configured (depending on at least DL UE processing capability) and indicated using the control information relevant for the inter-UE interference avoidance/reduction. The first one or more symbols in each slot may be used for an announcement signal transmission. The DL UE needs to first transmit such signal and then switch from TX to RX for DL reception. Therefore, the number of TTIs including the gap for TX to RX switch may be flexible configured depending on the DL UE capability. If such symbols are configured, the DL UE can transmit the inter-UE interference avoidance/reduction announcement signal in the configured symbols either on the resource indicated in the control information for the inter-UE interference avoidance/reduction or on the resource blocks of the scheduled DL assignment.

The announcement may be in the form of certain sequence pre-defined and specified in standardization or the sequence may be configured to the DL UE in the control information for the inter-UE interference avoidance/reduction.

The announcement may be in the form of signalling bits to indicate e.g. the priority of the DL scheduling assignment.

In some embodiments, the UE may determine the frequency and time domain resource for the transmission of the announcement signal as the latest predetermined location from the set of predetermined location/symbol(s) that are earlier than the scheduled transmission indicated by the DL assignment. For, example the predetermined location can be a certain symbol within each slot or the last flexible symbol indicated in the GC-PDCCH.

In step S8, the apparatus of HD UL UE is configured to determine in a first determination whether or not to perform or carry out an inter-UE interference avoidance/reduction procedure or process. This may be in dependence on the control information received from the FD BS.

Step S8 may be carried out before or after step S6 or at substantially the same time.

Step S8 may be carried out before step S7 or after step S7 or at substantially the same time.

If it is determined in step S8 by the apparatus of the HD UL UE that an inter-UE interference avoidance/reduction procedure should be carried out, then the apparatus of the HD UL UE is configured in step S9a to monitor for the inter-UE interference avoidance/reduction announcement signal from the HD DL UE.

In step S10a, the apparatus of HD UL UE is configured to determine in a second determination whether or not to transmit on the scheduled uplink resource in dependence on the monitoring.

In step S11, the apparatus of the HD UL UE will cause the HD UL UE to transmit to the FD BS on the scheduled resources if the result of the first determination is that there is no need for the inter UE interference avoidance/reduction procedure or if the result of the second determination is to transmit on the scheduled resource.

As an alternative to step S11, the apparatus of the HD UL UE will cause the HD UL UE not to transmit to the FD BS on the scheduled resources if the result of the second determination is not to transmit on the scheduled resource. If the UL transmission is not performed by the UE, the BS can detect the missing/error of UL transmission. The BS may re-schedule the UL UE transmission e.g. schedule non-overlapping resources.

It should be appreciated that step S9b which is the transmission of the DL data from the FD base station to the HD DL UE and the receipt of that data by the HD DL UE in step S10b will take place generally at the same time as step S11.

In some embodiments, the outcome of one or both determinations in UL UE may be based on a comparison of the priority level of the UL UE against the indicated priority level of the at least one of the DL UEs. If its own UL scheduling assignment has higher priority, the apparatus of the UL UE may be configured to cause the UL UE to transmit the scheduled UL transmission and indicate the detection of the DL announcement to FD BS to trigger the BS early suspension of the DL transmission on the overlapping resources.

In the previously described embodiments, the DL UEs perform S6 and S7 and UL UEs perform steps S8-12. The DL UE may be interfered when overlapping resource is scheduled. The UL UE is received by BS and the BS may have self-interference cancellation capability, so UL reception in BS is not problematic. In some embodiments, the UL UE may detect the existence of a DL UE and then refrain its UL transmission.

Alternatively, in some embodiments, step S6 and S7 be performed by the UL UEs and steps S8 to S12 be performed by the DL UEs.

Figure 7:
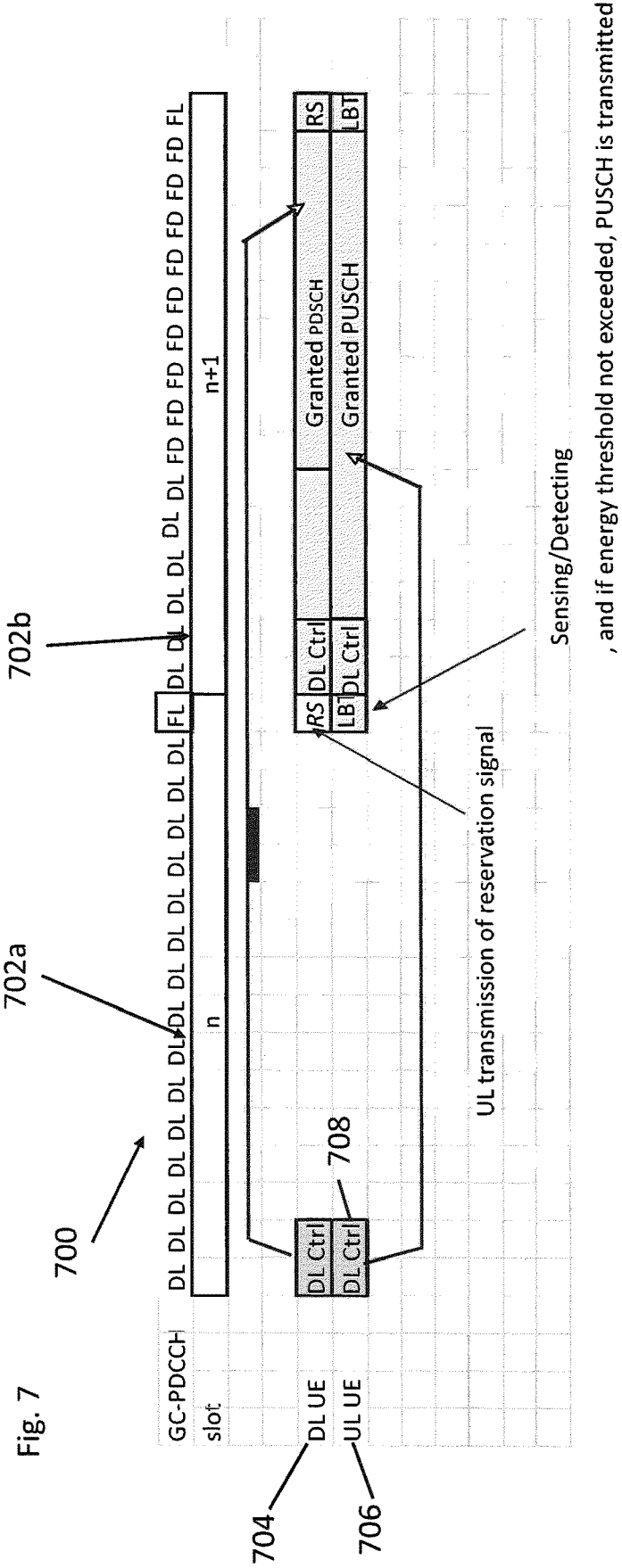
FIG. 7 shows an example of a channel with slots having symbols used in some embodiments.

FIG. 7 shows an example of an embodiment where the first determination is based on information received in the GC-PDCCH. Based on the type of the symbol indicated in the GC-PDCCH, the UE may determine whether or not to perform an avoidance/reduction mechanism.

The GC-PDCCH 700 has a first slot n which is referenced 702a and a second slot n+1 which is which is referenced 702b. In this example, the first slot mainly comprises DL symbols which are indicated by "DL" and the last symbol is a flexible symbol indicated by "FL". The second slot comprises 6 DL symbols followed by 9 FD symbols indicated by "FD". The last symbol is again a FL symbol.

Also shown is the DL UE behaviour referenced 704 and the UL UE behaviour referenced 706. The control information 708 is received by each of the UEs in a respective DL symbols at the beginning of slot n. This control information received by the DL UE is a DL assignment and by the UL UE an UL grant. Both UEs receive the GC-PDCCH indicating symbol type for slot n and n+1 as shown in 702*a* and 702*b*, respectively.

In this example, as the DL UE receives DL assignment that overlaps with FD symbol indicated in GC-PDCCH, it will perform the avoidance/reduction mechanism. Similarly, UL UE determines that the avoidance/reduction mechanism has to be performed. gNB indicates FD symbols in the GC-PDCCH to protect the DL transmission for the DL UE.

In this case the predetermined location slot is indicated using the flexible symbol in the GC-PDCCH, and avoidance/reduction procedure occurs in slot n (in the FL symbol) for the granted and assigned resources in the slot n+1 that has been scheduled in control information 708 with K0=1 and K2=1 from the slot n. In this example, if the UL UE determines that it would cause a collision for the DL UE, it may still transmit a first part of granted PUSCH and puncture/drop the rest of transmission overlapping with the FD symbols. Such, a gNB operating with a CBG (code block group), may receive at least one or two CBG for the granted PUSCH successfully.

Reference is made to FIG. 8 which shows a method performed in a base station. In some embodiments, the method may be performed by an apparatus of the base station. The apparatus in some embodiments may be provided by at least one processor and at least one memory. Computer executable code may run on the memory. Alternatively or additionally, the apparatus may comprise circuitry such as discussed later.

In step S1, the method comprises causing scheduling information to be transmitted to a plurality of communication devices and control information to be transmitted to at least one communication device of the plurality of communication devices.

The control information may controlling in the respective communication device at least one of triggering an inter communication device interference reduction mechanism and parameters of the inter communication device interference reduction mechanism.

Reference is made to FIG. 9 which shows a method performed in a communication device. In some embodiments, the method may be performed by an apparatus in the communication device. The apparatus in some embodiments may be provided by at least one processor and at least one memory. Computer executable code may run on the memory. Alternatively or additionally, the apparatus may comprise circuitry such as discussed later.

In step T1, the method comprises receiving from a base station scheduling information and control information. The control information is for controlling at least one of triggering an inter communication device interference reduction mechanism and parameters of the inter communication device interference reduction mechanism.

It is noted that while the above described example embodiments, there are several variations and modifications which may be made to the disclosed solution without departing from the scope of the present invention. These aspects may be transposed to other radio access technology systems other than those described purely by way of example.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., in FIGS. 6*a*, 6*b*, 8 and 9 may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example an integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus comprising at least one processor and at least one memory including computer code for one or more programs, the at least one memory and the computer code configured, with the at least one processor, to cause the apparatus at least to:
   cause scheduling information to be transmitted to a plurality of communication devices and control information to be transmitted to at least one communication device of the plurality of communication devices, said control information controlling in the respective communication device at least one of triggering an inter communication device interference reduction mechanism and parameters of the inter communication device interference reduction mechanism, wherein the control information includes a time-frequency information, allocated reference signal and transmission power signalled together with the scheduling information and wherein the control information is signalled in a half-duplex (HD) carrier,
   wherein the at least one memory and the computer code are configured, with the at least one processor, to cause the apparatus to:
   receive an inter-UE interference avoidance/reduction announcement signal wherein the announcement signal may uses the reference signal,
   determine as a first determination that an inter communication device interference reduction mechanism between a plurality of said plurality of communication devices is required based on inter-user equipment (UE) avoidance control information,
   monitor for an inter-UE interference reduction announcement signal,
   receive a transmission of downlink data,
   determine as a second determination to transmit a scheduled uplink communication based upon the outcome of the monitoring for the inter-UE interference reduction announcement signal,
   transmit on a scheduled uplink resource based on a negative determination of the inter communication device interference reduction mechanism between a plurality of said plurality of communication devices being required based on inter-user equipment (UE) avoidance control information or a positive determination to transmit the scheduled uplink communication based upon the outcome of the monitoring for the inter-UE interference reduction announcement signal, and
   transmit a scheduled uplink transmission upon a determination that the communication device interference reduction mechanism is not required.

2. The apparatus as claimed in claim 1, wherein the control information provided is dependent on said determining.

3. The apparatus as claimed in claim 1, wherein the at least one memory and the computer code are configured, with the at least one processor, to cause the apparatus to determine that an inter communication device interference reduction mechanism between a plurality of said plurality of communication devices is required is dependent on one or more of:
   location of one or more of the plurality of communication devices;
   channel conditions associated with one or more of the plurality of communication devices;
   quality of service of the data flow associated with one or more of the plurality of communication devices;
   at least one communication device of the plurality of communication devices is scheduled to transmit at a same time and on a same frequency as at least one other communication device is scheduled to receive; or
   beam management information.

4. An apparatus, said apparatus comprising or comprised in a communications device, the apparatus comprising at least one processor and at least one memory including computer code for one or more programs, the at least one memory and the computer code configured, with the at least one processor, to cause the apparatus at least to:
   receive from a base station scheduling information and control information, said control information for controlling at least one of triggering an inter communication device interference reduction mechanism and parameters of the inter communication device interference reduction mechanism, wherein the control information includes a time-frequency information, allocated reference signal and transmission power signalled together with the scheduling information and wherein the control information is signalled in a half-duplex (HD) carrier,
   receive an inter-UE interference avoidance/reduction announcement signal wherein the announcement signal may uses the reference signal,
   determine as a first determination that an inter communication device interference reduction mechanism between a plurality of said plurality of communication devices is required based on inter-user equipment (UE) avoidance control information,
   monitor for an inter-UE interference reduction announcement signal,
   receive a transmission of downlink data,
   determine as a second determination to transmit a scheduled uplink communication based upon the outcome of the monitoring for the inter-UE interference reduction announcement signal,
   transmit on a scheduled uplink resource based on a negative determination of the inter communication device interference reduction mechanism between a plurality of said plurality of communication devices being required based on inter-user equipment (UE) avoidance control information or a positive determination to transmit the scheduled uplink communication based upon the outcome of the monitoring for the inter-UE interference reduction announcement signal, and
   transmit a scheduled uplink transmission upon a determination that the communication device interference reduction mechanism is not required.

5. The apparatus as claimed in claim 4, wherein the at least one memory and the computer code are configured, with the at least one processor, to cause the apparatus to, in dependence on the control information, transmit an announcement signal for said the inter communication device interference reduction mechanism.

6. The apparatus as claimed in claim 4, wherein the at least one memory and the computer code are configured, with the at least one processor, to cause the apparatus to, in dependence on the control information, perform detection of an announcement signal transmitted by another communication device.

7. The apparatus as claimed in claim 6, wherein the at least one memory and the computer code are configured, with the at least one processor, to cause the apparatus to, in dependence on the control information, perform detection of the announcement signal in dependence on a detection of an energy of said announcement signal.

8. The apparatus as claimed in claim 6, wherein the at least one memory and the computer code are configured, with the at least one processor, to cause the apparatus to, determine in dependence on said detection if the communications device is to transmit a scheduled transmission in accordance with the scheduling information.

9. The apparatus as claimed in claim 4, wherein the at least one memory and the computer code are configured, with the at least one processor, to cause the apparatus to cause a subset of symbols of a scheduled transmission to be transmitted, said scheduled transmission being in accordance with said scheduling information.

10. The apparatus as claimed in claim 9, wherein said subset of symbols are not associated with full duplex operation.

11. The apparatus as claimed in claim 4, wherein the at least one memory and the computer code are configured, with the at least one processor, to cause the apparatus to, determine if the communication device is to communicate with the base station in accordance with the scheduling information in dependence on one or more of:
  a detection of the announcement signal;
  a priority associated with at least one data flow of the communications device; or
  a priority associated with at least one data flow of another communication device.

12. The apparatus as claimed in claim 4, wherein the control information comprises an indication indicative of at least one of:
  that an inter communication device interference procedure is to be performed;
  that the inter communication device interference reduction mechanism is to be performed is provided by one or more symbols in the scheduling information overlapping with one or more full-duplex time slots;
  one or more predetermined locations of one or more of said communication devices in which said interference reduction mechanism is to be performed, and selecting one from one or more predetermined locations as a latest one preceding a scheduled transmission and fulfilling a processing time requirement;
  a flexible symbol preceding a scheduled transmission in which said interference reduction mechanism is to be performed;
  announcement signal information to be used for one of causing the announcement signal to be transmitted and receiving the announcement signal.

13. The apparatus as claimed in claim 12, wherein the announcement signal information comprises one or more of:
  resource information associated with one or more resources on which said announcement signal is to be one of transmitted and received; or
  power information associated with a power with which said announcement signal is to be transmitted.

14. The apparatus as claimed in claim 4, wherein the control information comprises at least one of:
  priority information associated with the data of at least one communication device; or
  information indicating that suspension of a transmission from at least one communication device is supported.

15. The apparatus as claimed in claim 4, wherein at least one communication device is scheduled at a same time and on a same frequency as at least one other communication device.

16. The apparatus as claimed in claim 15, wherein at least one communication device is scheduled to transmit at a same time and on a same frequency as at least one other communication device is scheduled to receive.

17. The apparatus as claimed in claim 16, wherein the same time is a time slot in a full duplex carrier.

18. A method performed in a communication device, said method comprising:
  receiving from a base station scheduling information and control information, said control information for controlling at least one of triggering an inter communication device interference reduction mechanism and parameters of the inter communication device interference reduction mechanism, wherein the control information includes a time-frequency information, allocated reference signal and transmission power signalled together with the scheduling information and wherein the control information is signalled in a half-duplex (HD) carrier;
  receiving an inter-UE interference avoidance/reduction announcement signal wherein the announcement signal uses the reference signal;
  determining as a first determination that an inter communication device interference reduction mechanism between a plurality of said plurality of communication devices is required based on inter-user equipment (UE) avoidance control information;
  monitoring for an inter-UE interference reduction announcement signal;
  receiving a transmission of downlink data;
  determining as a second determination to transmit a scheduled uplink communication based upon the outcome of the monitoring for the inter-UE interference reduction announcement signal;
  transmitting on a scheduled uplink resource based on a negative determination of the inter communication device interference reduction mechanism between a plurality of said plurality of communication devices being required based on inter-user equipment (UE) avoidance control information or a positive determination to transmit the scheduled uplink communication based upon the outcome of the monitoring for the inter-UE interference reduction announcement signal; and
  retraining to transmitting a scheduled uplink transmission upon a determination that the communication device interference reduction mechanism is not required.

* * * * *